(12) United States Patent
Fujii

(10) Patent No.: US 6,825,881 B1
(45) Date of Patent: Nov. 30, 2004

(54) IMAGE SENSING APPARATUS

(75) Inventor: Takashi Fujii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/266,282

(22) Filed: Mar. 11, 1999

(30) Foreign Application Priority Data

Mar. 11, 1998 (JP) .......................................... 10-059489

(51) Int. Cl.$^7$ .............................................. G02B 13/16
(52) U.S. Cl. ..................... 348/335; 396/349; 396/374
(58) Field of Search .................................. 396/349, 374, 396/321, 277, 86, 284; 348/335, 333.13, 373–326; 358/474, 494, 497

(56) References Cited

U.S. PATENT DOCUMENTS

| | | | |
|---|---|---|---|
| 4,673,267 A | | 6/1987 | Erxleben |
| 5,136,320 A | * | 8/1992 | Kobayashi et al. ............ 396/86 |
| 5,293,191 A | * | 3/1994 | Umetsu ....................... 396/406 |
| 5,546,147 A | * | 8/1996 | Baxter et al. ................ 396/349 |
| 5,600,390 A | * | 2/1997 | Tsuru et al. ................. 396/133 |
| 5,625,852 A | * | 4/1997 | Wada et al. ................. 396/349 |
| 5,729,776 A | | 3/1998 | Nakamura et al. |
| 6,327,001 B1 | * | 12/2001 | Yamagishi .................. 348/552 |

FOREIGN PATENT DOCUMENTS

| | | |
|---|---|---|
| JP | 05158122 | 6/1993 |
| JP | 06186629 | 7/1994 |
| JP | 06208168 | 7/1994 |
| JP | 09034003 | 2/1997 |
| JP | 09090196 | 4/1997 |

OTHER PUBLICATIONS

Communication from European Patent Office for Applicant No. 99104776. 2–2217 dated Jun. 11, 2002.
Abstract for JP 06208168 (English Version).
Abstract for JP 05158122 (English Version).
English Abstract for JPA 09034003.
English Abstract for JPA 06186629.
English Abstract for JPA 09090196.
European Search Report dated Sep. 3, 2002.

* cited by examiner

*Primary Examiner*—Andrew Christensen
*Assistant Examiner*—Dorothy Wu
(74) *Attorney, Agent, or Firm*—Morgan & Finnegan, L.L.P.

(57) ABSTRACT

An image sensing apparatus such as digital still camera and video camera having a lens barrel which is driven to extended-out and retracted-in positions. The apparatus comprises an external operation device externally operated by a user. When the image sensing apparatus is released from a disabled mode, the user is allowed to make a selection between cases where the optical system is positioned in the extended-out position and retracted-in position, through the operation device.

32 Claims, 17 Drawing Sheets

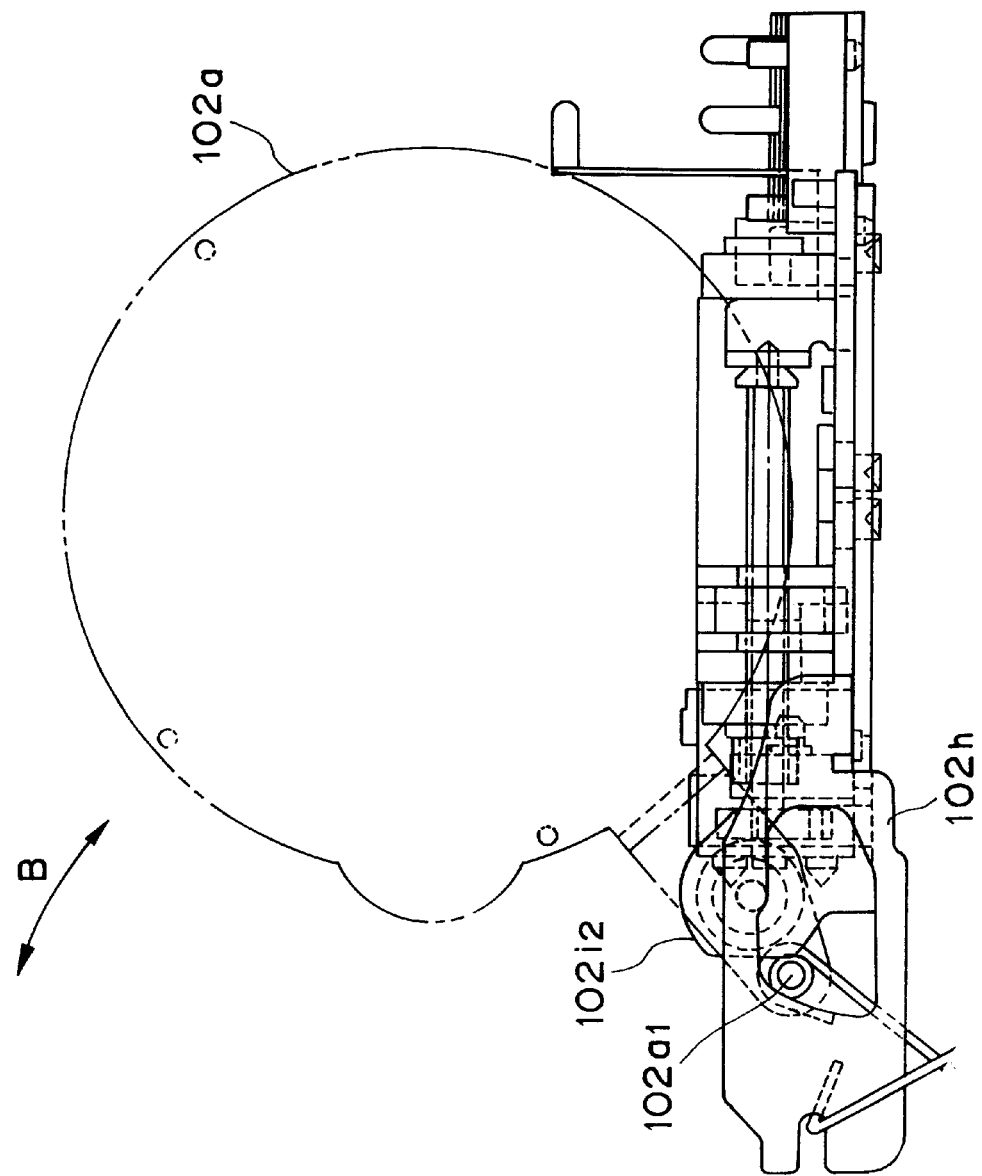

ained as retracted. In FIG. 1, reference numeral 60 denotes
IMAGE SENSING APPARATUS

BACKGROUND OF THE INVENTION

The present invention relates to an image sensing device and a recording/reproduction device such as an electronic still camera and a video camera.

There have been proposed compact cameras using silver-salt films with a collapsible lens barrel. Compact cameras are designed to extend the barrel outwardly to a photographable position where the cameras are operable to take a picture when a power supply is turned-on, while retracting the barrel to a retracted position, or collapse position, when the power is turned-off, thus providing portability. FIG. 1 illustrates a perspective view showing a camera having such collapsible or retractable barrel, wherein the barrel is illustrated as retracted. In FIG. 1, reference numeral 60 denotes an operation lever for opening and closing a barrier (not shown). A user operates this operation lever 60 to open the barrier connected.

However, such cameras keep a collapsible barrel extended out during powered-on, so that the barrel is ready to be broken during the it is extended out.

SUMMARY OF THE INVENTION

The present invention has been made in consideration of the aforementioned problem involved in the prior art.

An object of the present invention is to provide an image sensing apparatus comprising:

a driver device moving an image sensing optical system to image sensing and non image sensing regions; and an external operation device that voluntarily selects a first mode in which the optical system is in the image sensing region or a second mode in which the optical system is positioned in the non image sensing region by an external operation, wherein the first mode and the second mode are different from an OFF mode.

The image sensing apparatus constructed above positions the optical system in the non image sensing region even when the apparatus is powered up, in a case where an electronic finder is being OFF'ed, or images are being reproduced, for examples. In such cases, it does not matter that the optical system is in the non image sensing region, and placing the optical system in the non image sensing region can prevent it from being broken accidentally.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A and 3B are plan and front views respectively showing a lens barrier in the image sensing device illustrated in FIG. 2;

FIGS. 13A and 28B are a flow chart showing operation operated by a CPU of the image sensing device illustrated in FIG. 2;

DETAILED DESCRIPTION OF THE INVENTION

A preferred embodiment according to the present invention will be described in detail below with reference to the accompanying drawings.

Figure 1:
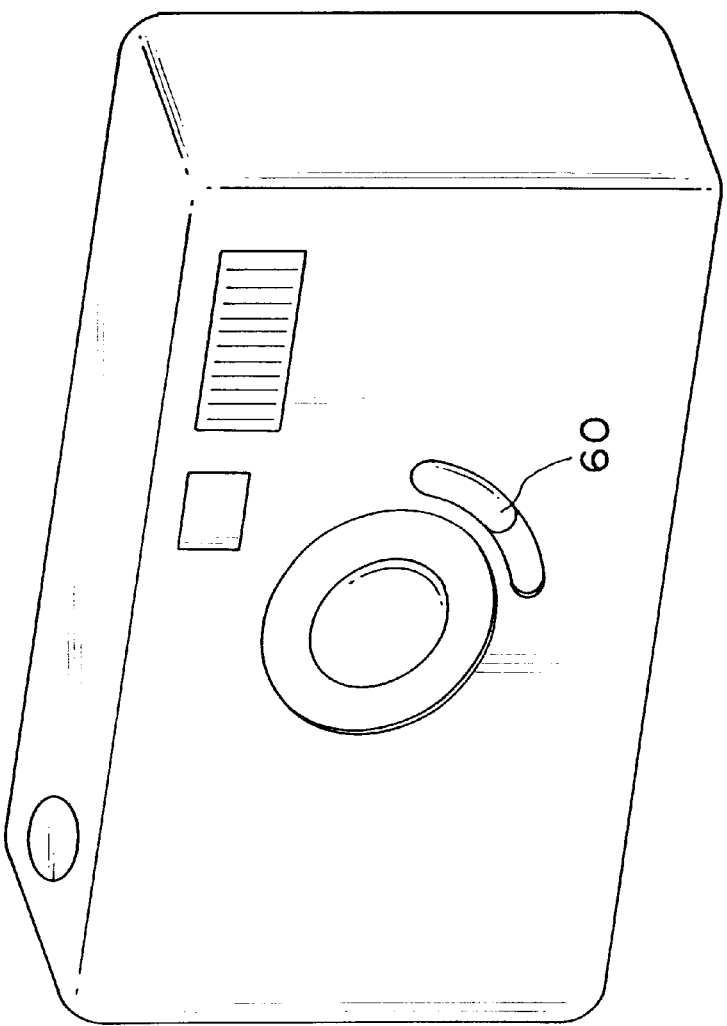
FIG. 1 is a perspective view showing a conventional digital camera.
Figure 2:
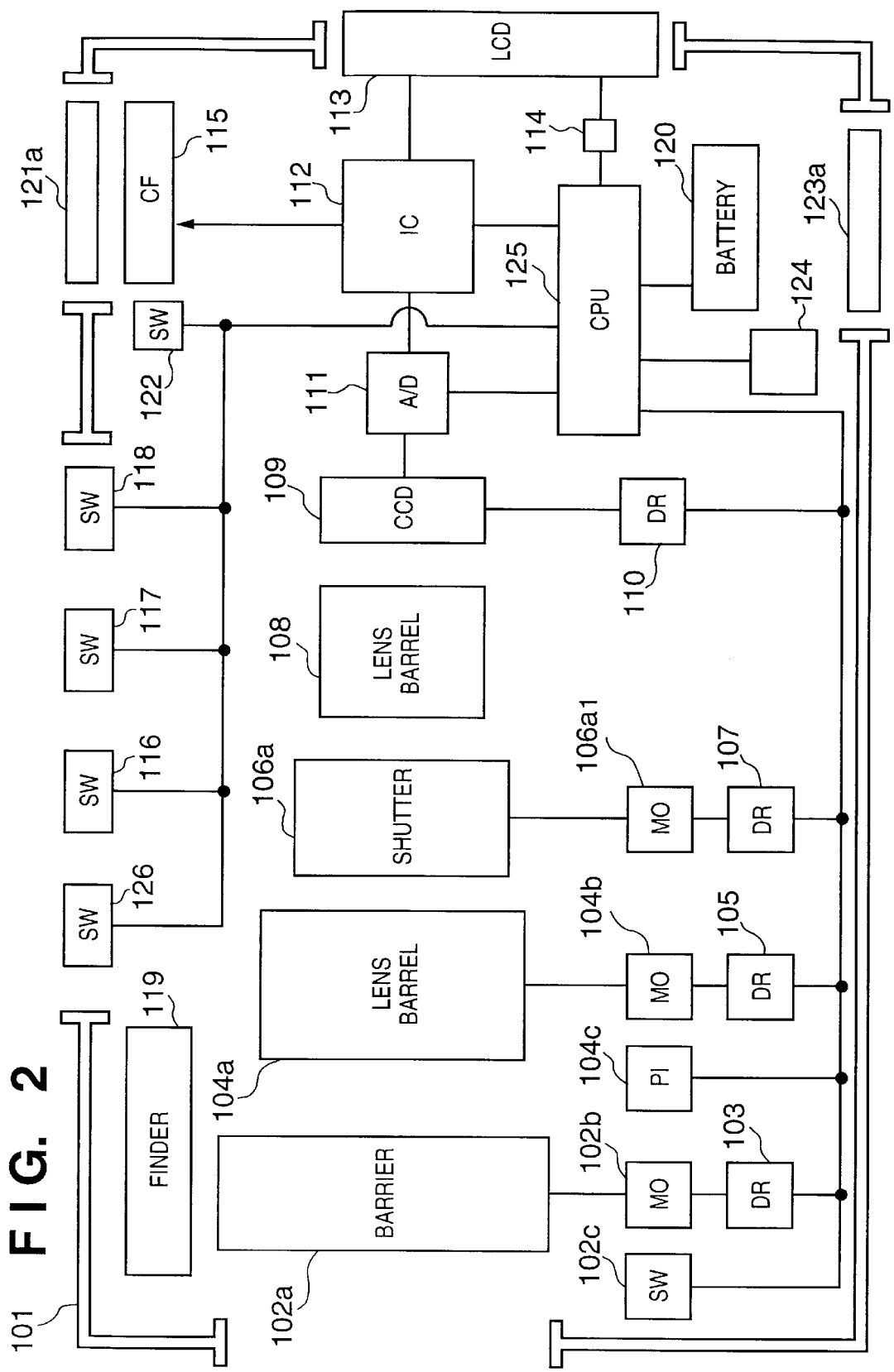
FIG. 2 is a block diagram showing an image sensing device of an embodiment according to the present invention.

FIG. 2 is a block diagram showing an image sensing device of the embodiment.

In FIG. 2, reference numeral 101 denotes a housing (outer casing) covering the whole image sensing device; and 102*a*, an electrically openable lens barrier placed inside the housing 101. When a moving lens barrel (to be described later) is housed (collapsed), the lens barrier 102*a* is so positioned as to cover the front surface of the moving lens barrel. An actuator 102*b* is, e.g., a stepping motor and opens and closes the lens barrier 102*a*. A detection switch 102*c* is, e.g., a leaf switch and detects "opening" and "closure" of the lens barrier 102*a*.

A motor driver 103 drives the stepping motor as the actuator 102*b*. The constructions of the lens barrier 102*a*, the stepping motor as the actuator 102*b*, the detection switch 102*c*, and the like will be described in detail later.

A moving lens barrel 104*a* can be collapsed inside the housing 101 to a non image sensing position in a non image sensing mode and extended to an image sensing position outside the housing 101 in a sensing mode. This moving lens barrel 104*a* holds some photographing lenses. In this image sensing device, the moving lens barrel 104*a* moves to achieve a focusing function. An actuator 104*b* is, e.g., a stepping motor and moves the lens barrel 104*a*. A detecting means 104*c* is, e.g., a photointerrupter and detects the reset position of the moving lens barrel 104*a*.

A motor driver 105 drives the stepping motor of the actuator 104*b*. An aperture/shutter 106*a* has both of an aperture function of adjusting the sensing light amount and a shutter function. An actuator 106*a_1* actually drives aperture blades. A motor driver 107 drives the actuator 106*a_1*. Reference numeral 108 denotes a fixed lens barrel for mounting a CCD or the like. This fixed lens barrel 108 holds fixed photographing lenses except for those held by the moving lens barrel 104*a*. A photoelectric converting element or CCD 109 converts an optical image formed by the photographing lenses into an electrical signal. A driver 110 drives the CCD 109.

An A/D converter 111 converts the electrical signal from the CCD 109 into a digital signal. An image signal processing IC 112 converts the digital signal from the A/D converter 111 into a signal of a format suited for display on an LCD (to be described below) or a signal of a format suited for recording on a recording medium inserted into a CF slot (recording medium slot to be described later). An LCD 113, as an electronic view finder, displays the signal from the image signal processing IC 112. This LCD 113 allows a user to observe live object images formed by the photographing lenses. A driver 114 drives the LCD 113.

Reference numeral 115 denotes a CF slot (recording medium slot) into which a CF card (recording card) can be inserted. This CF slot 115 can record a signal processed by the image signal processing IC 112 on the recording medium. An LCD switch 116 can switch ON and OFF of the LCD 113 in a toggle manner. A REC/LOCK switch 117 can switch this image sensing device between a sensing mode (REC mode) and an operation stop mode (LOCK mode). When the switch is turned to REC mode, the image sensing device is powered on and ready to start an image sensing, while when it is turned to LOCK mode, the device is powered off. A release switch 118 allows to initiate image sensing operation when the REC/LOCK switch 117 is in the REC position. This release switch 118 has two stroke positions: the first position is referred to as a first release position, and the second position is as a second release position. When the switch 118 is at the first stroke position, AE (automatic-exposure) and AF (automatic-focusing) operations are enabled, while when the switch 118 is at the second stroke position, an image sensing is enabled. The switches 116, 117 and 118 are manually operated. The AF mechanism of this image sensing device is so-called hill climbing TVAF.

Reference numeral 119 denotes an optical finder through which a user can optically observe an object image; 120, a battery box into which a battery for supplying power to the image sensing device can be inserted; and 121a, a CF cover for covering the CF slot. This CF cover 121a has a lock mechanism and can be opened only when this lock mechanism is unlocked. A CF cover unlock detection switch 122 detects that the lock mechanism of the CF cover 121a is unlocked. It is possible by this switch to detect the possibility of the CF cover 121a being opened.

Reference numeral 123a denotes a battery cover for covering the battery box. This battery cover 123a has a lock mechanism and can be opened only when this lock mechanism is unlocked. A battery cover unlock detection switch 124 detects that the lock mechanism of the battery cover 123a is unlocked. It is possible by this switch to detect the possibility of the battery cover 123a being opened.

Reference numeral 126 denotes a manually operated switch by which a user switches a macro sensing region and a non-macro sensing region, thereby switching normal distance sensing (non-macro) and macro distance sensing (macro). A CPU 125 detects the states of the switches, controls the drivers and the A/D converter, checks the voltage of the battery in the battery box, detects a system error and the like of this image sensing device, and controls the image sensing device.

Figure 3A:
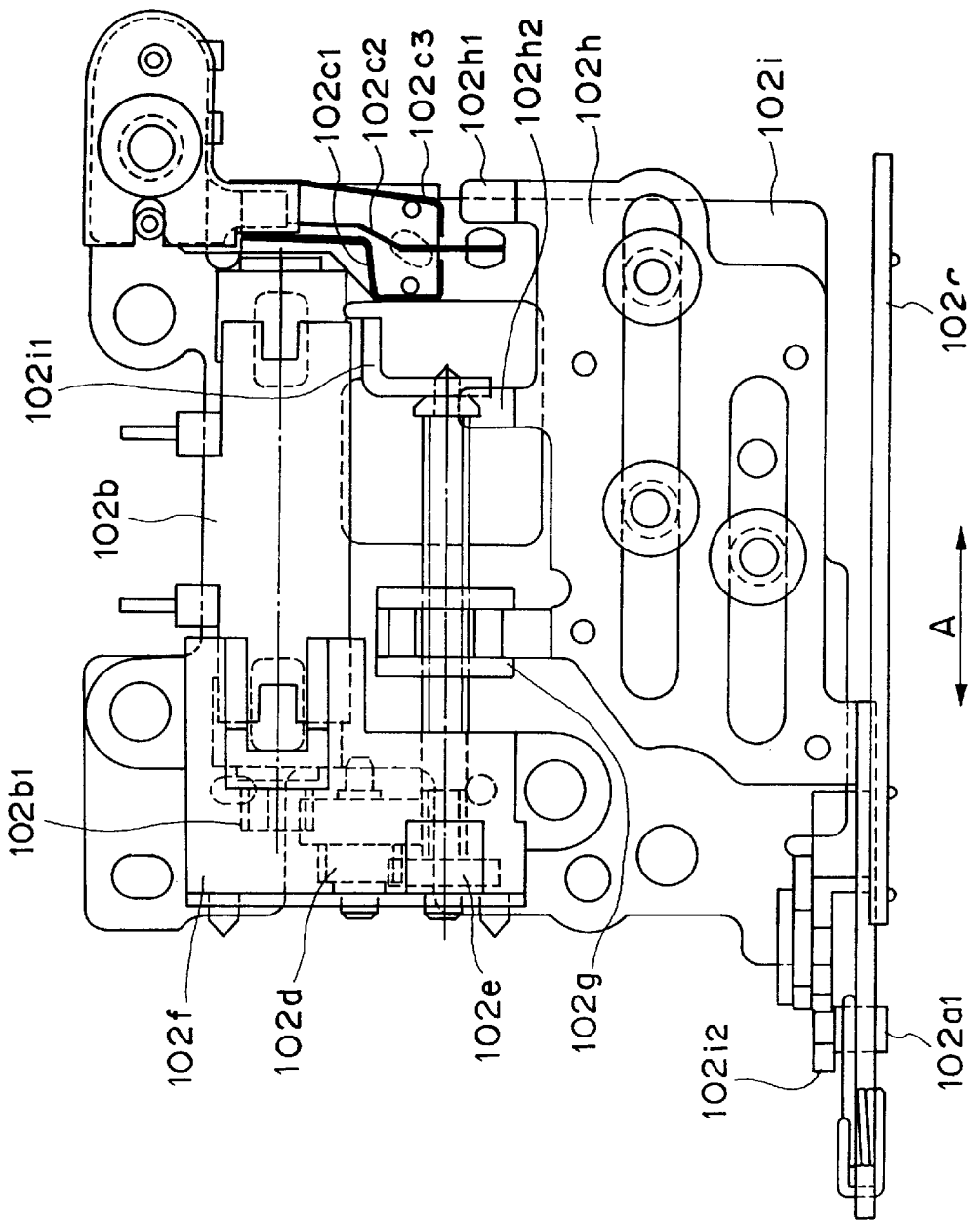

FIGS. 3A and 3B are plan and front views respectively showing details of the lens barrier unit including the lens barrier 102a, the stepping motor as the actuator 102b, and the detection switch 102c.

The actuator 102b is a stepping motor having an output shaft into which a pinion gear $102b_1$ is pressed. The rotation of this stepping motor 102b is transmitted to a two-stage gear 102d and an output screw 102e formed by integrating a lead screw and a spur gear. The stepping motor 102b, the two-stage gear 102d, and the output screw 102e are mounted on a gear box 102f which is fixed to a barrier base 102i. The tip of the output screw 102e is received by a bearing $102i_1$ of the barrier base 102i.

The rotation of the output screw 102e is transmitted to a nut 102g engaging with the screw. This nut 102g engages with the slider 102h which is so caulked as to be movable in a direction A on the barrier base 102i. The lens barrier 102a is rotatably caulked to a support portion $102i_2$ of the barrier base 102i. This lens barrier 102a is engaged with the slider 102h by a bias spring 102j extended between a shaft $102a_1$ caulked to the lens barrier 102a and a slider 102h. Accordingly, when the slider 102h moves in the direction A (FIG. 3A), the lens barrier 102a rotates in a direction B (FIG. 3B) to open or close.

Leaf switches $102c_1$, $102c_2$, and $102c_3$ detect opening and closure of the lens barrier 102a. That is, a member $102h_1$ of the slider 102h which moves integrally with the lens barrier 102a pushes the leaf switch $102c_2$ and brings it into contact with the leaf switch $102c_1$. Also, a member $102h_2$ pushes the leaf switch $102c_2$ and brings it into contact with the leaf switch $102c_3$. In this manner opening or closure of the lens barrier 102a is detected.

Figure 4:
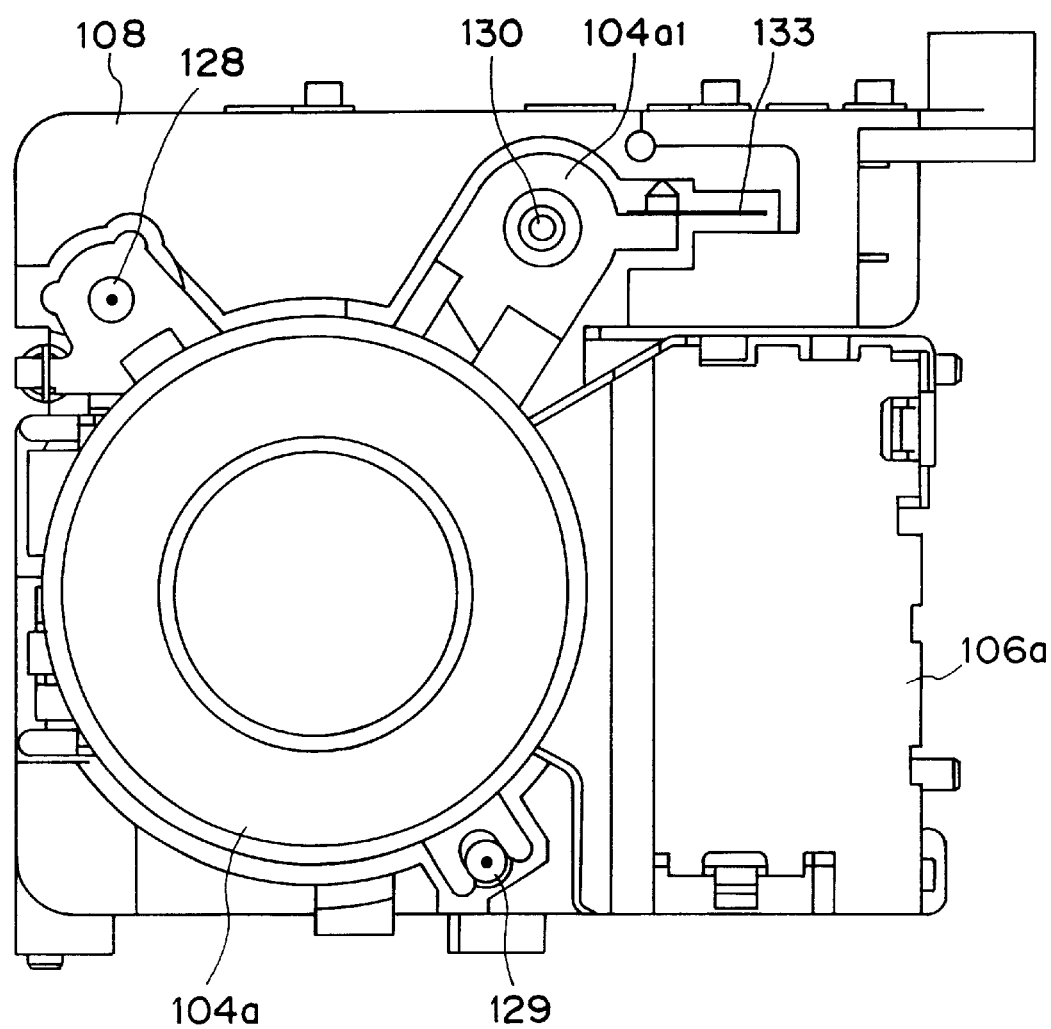
FIG. 4 is a view showing a lens barrel in the image sensing device illustrated in FIG. 2.
Figure 5:
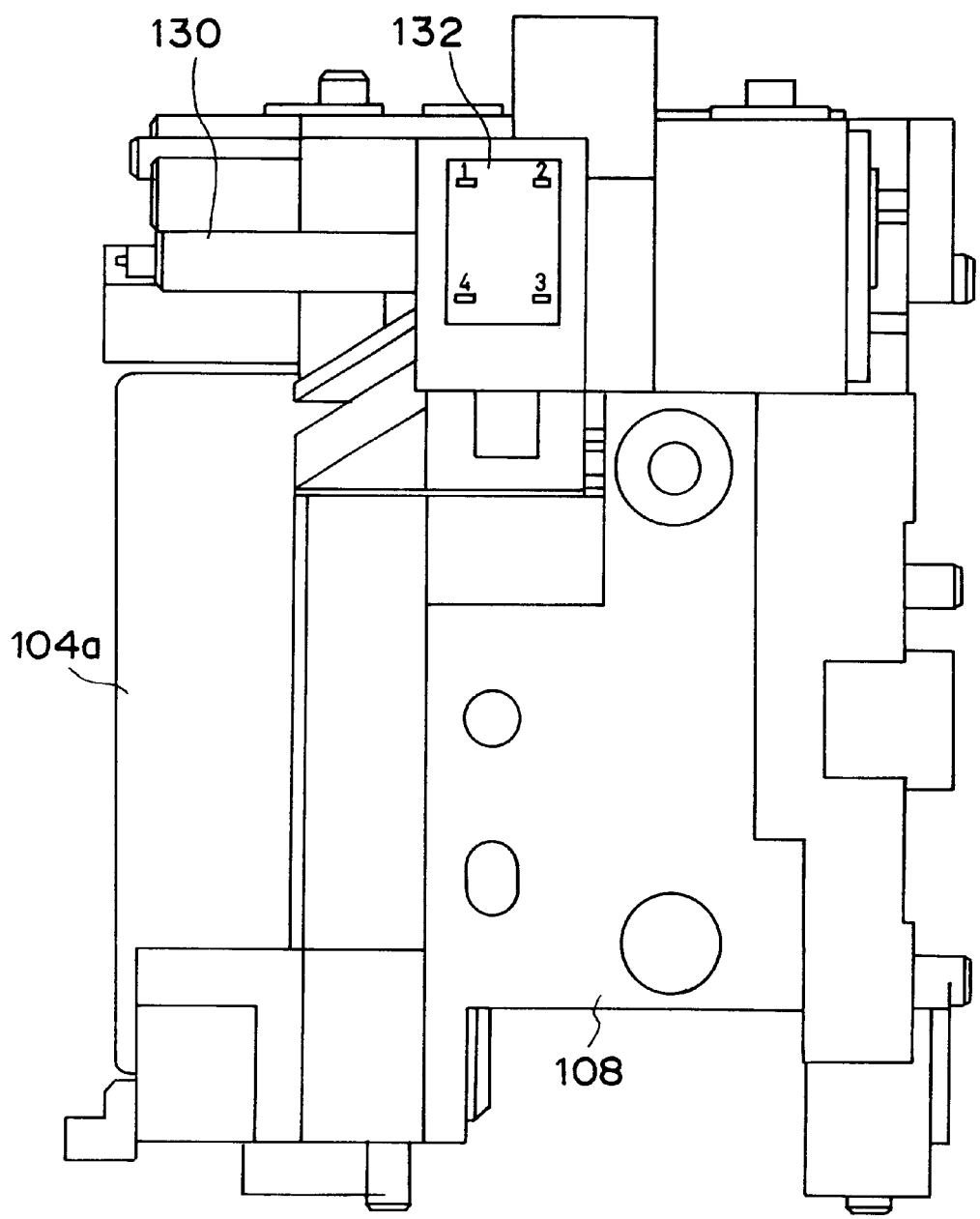
FIG. 5 is a view showing the lens barrel in the image sensing device illustrated in FIG. 2.
Figure 6:
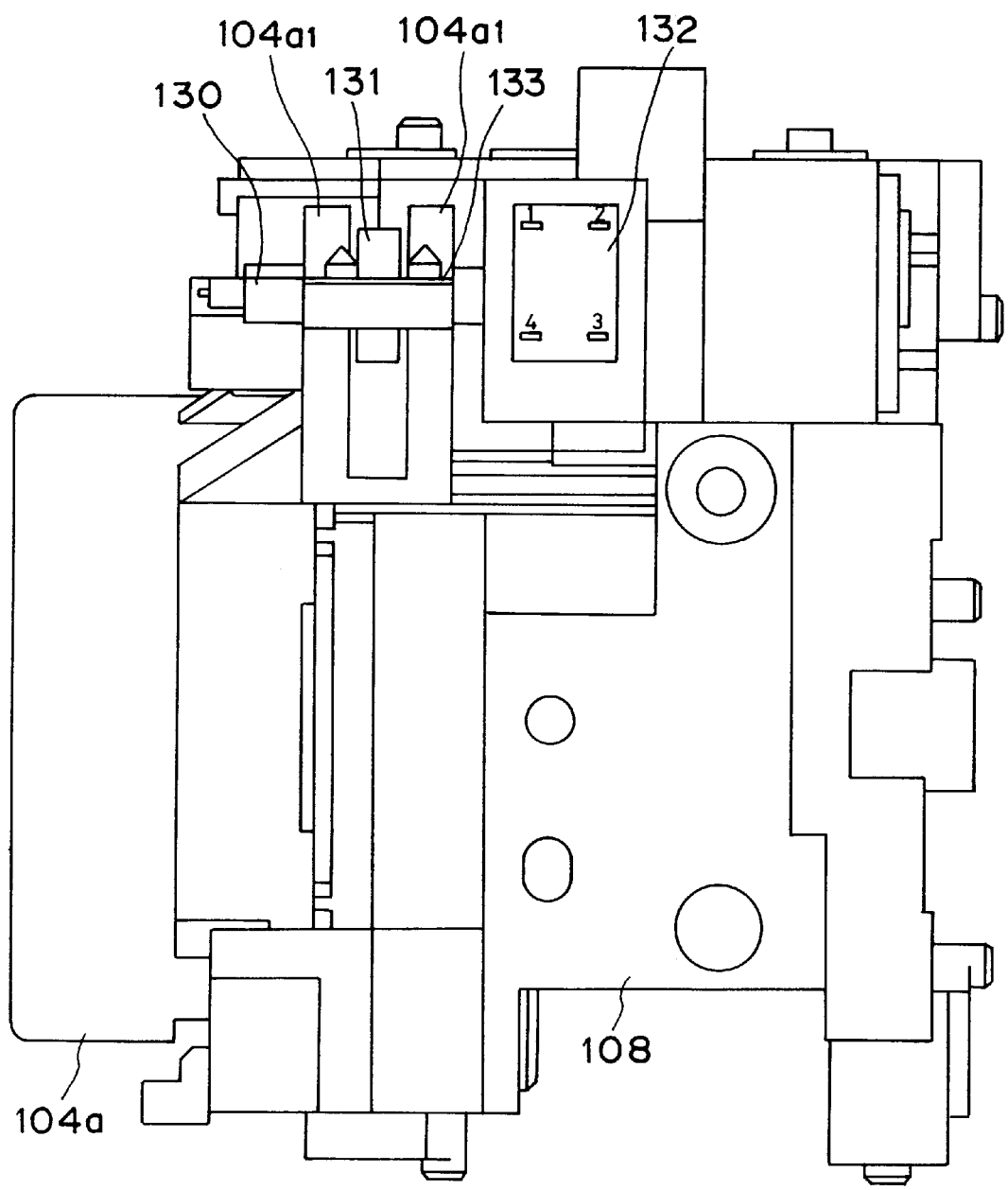
FIG. 6 is a view showing the lens barrel in the image sensing device illustrated in FIG. 2.
Figure 7:
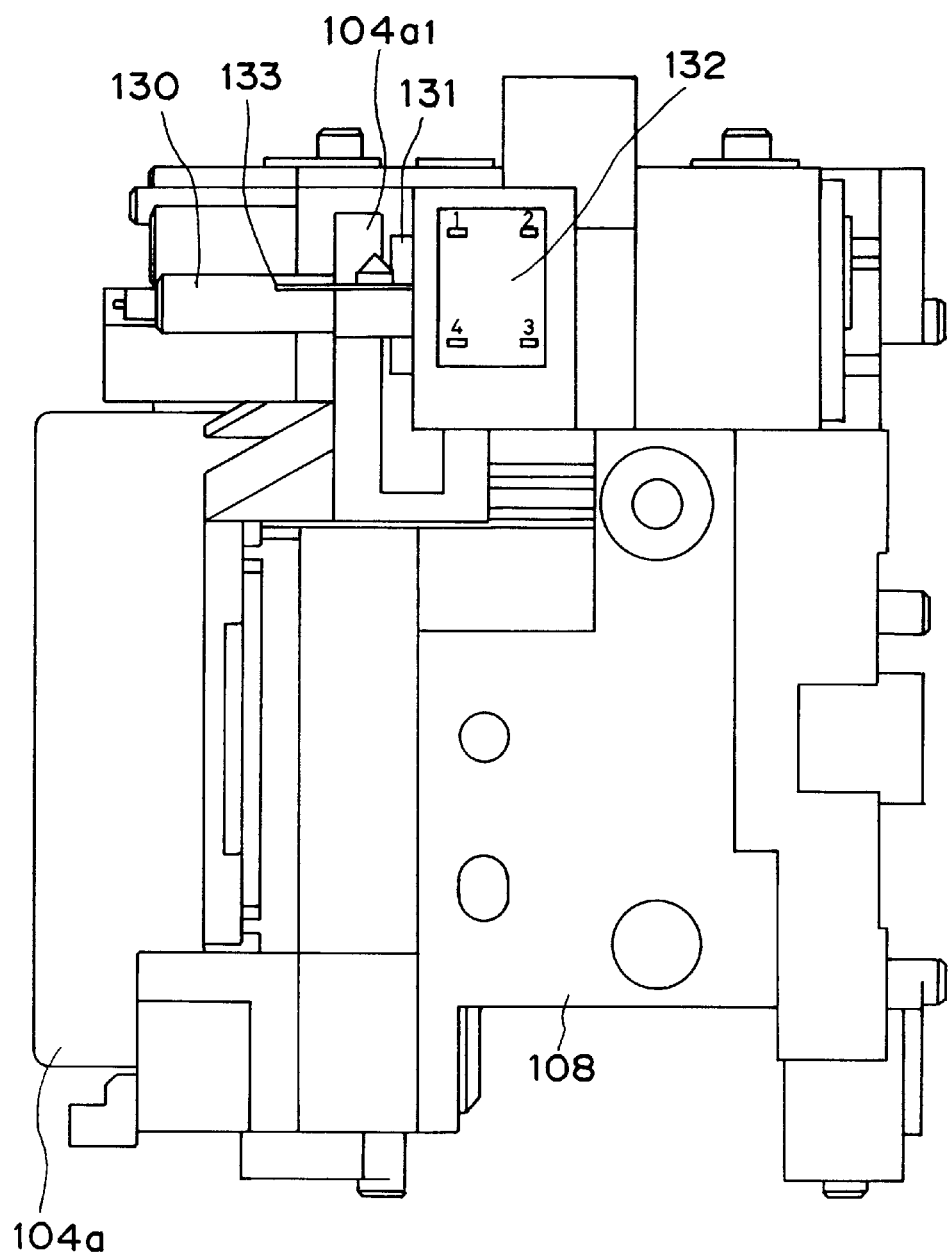
FIG. 7 is a view showing the lens barrel in the image sensing device illustrated in FIG. 2.
Figure 8:
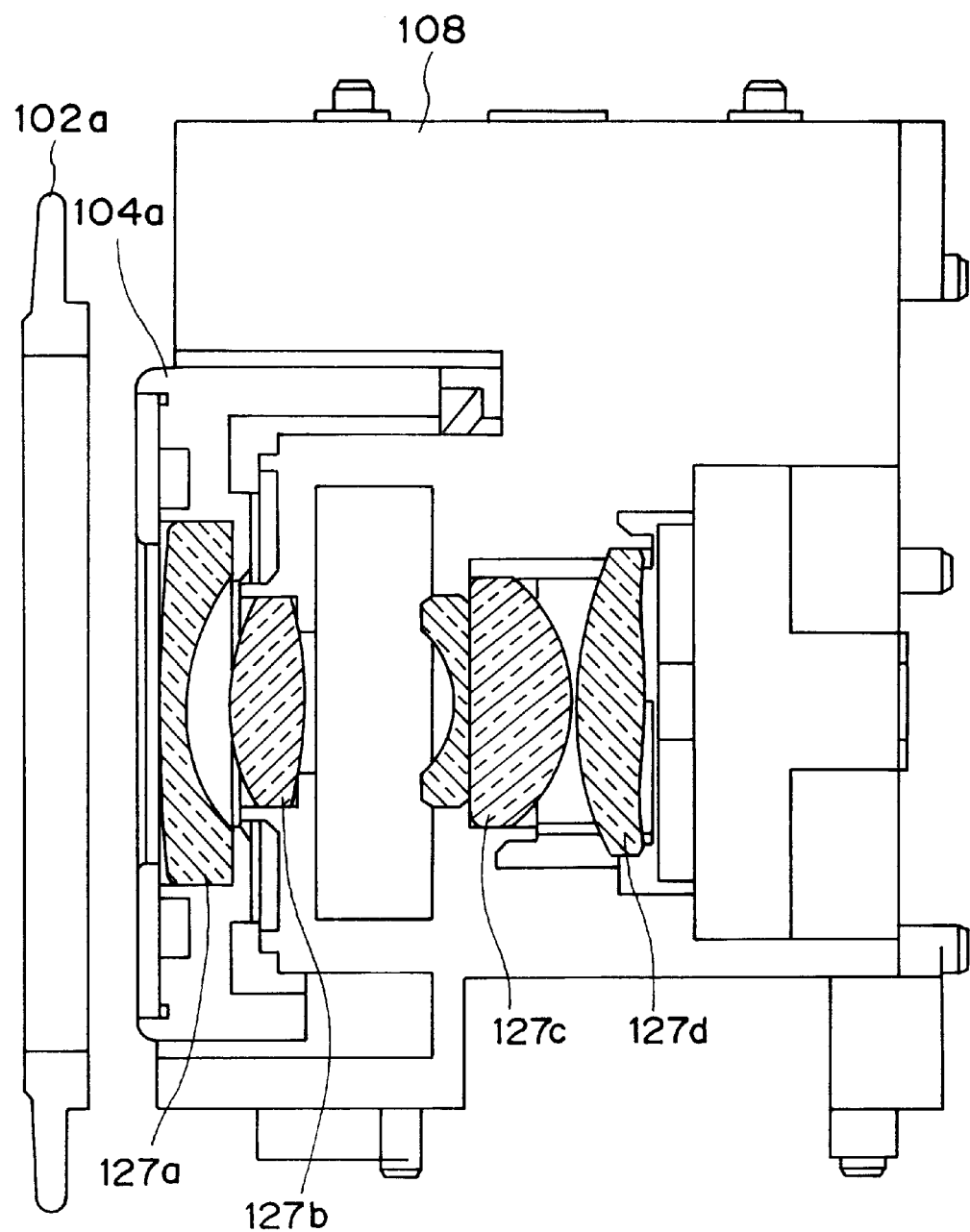
FIG. 8 is a view showing the lens barrel in the image sensing device illustrated in FIG. 2.
Figure 9:
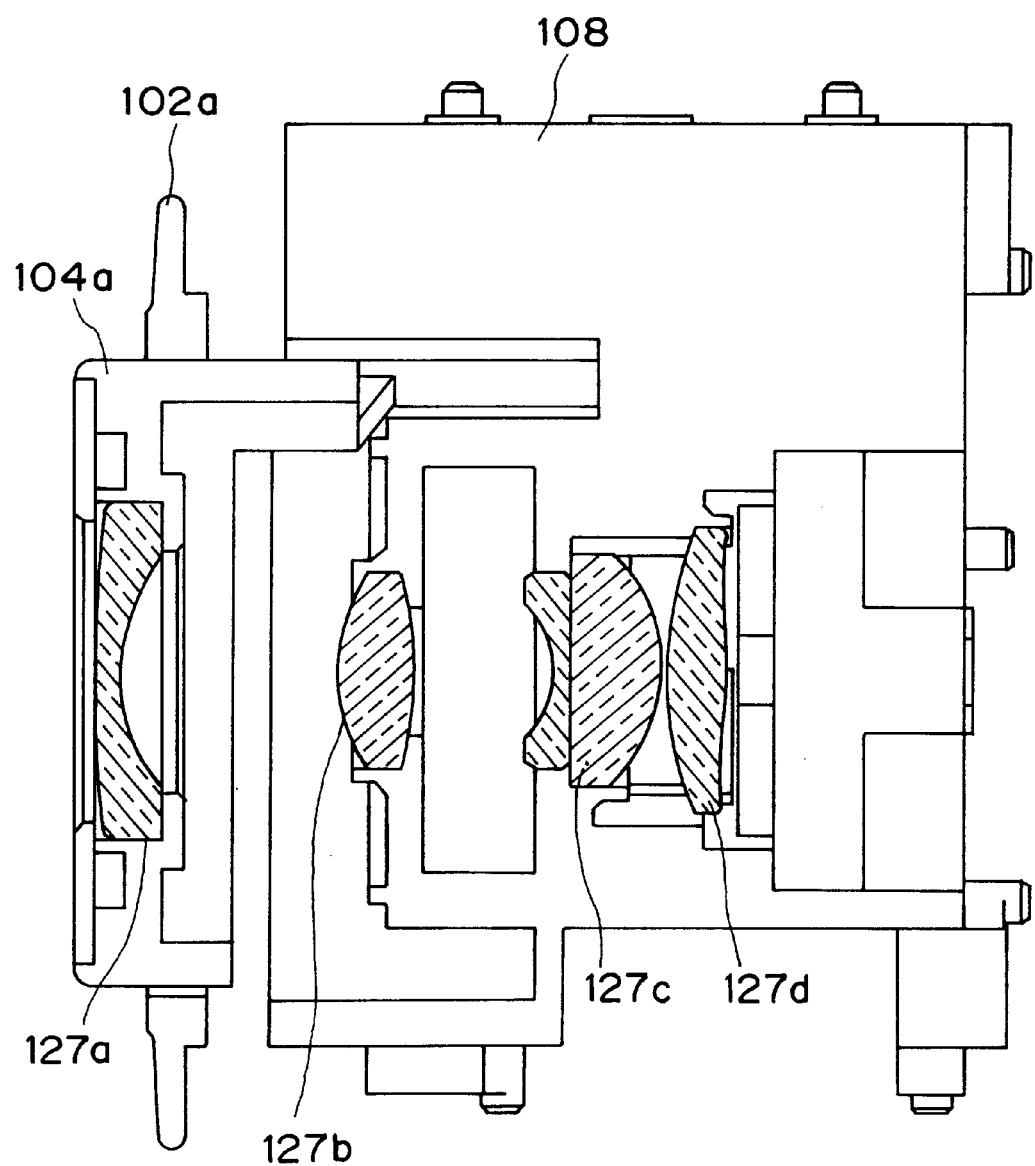
FIG. 9 is a view showing the lens barrel in the image sensing device illustrated in FIG. 2.
Figure 10:
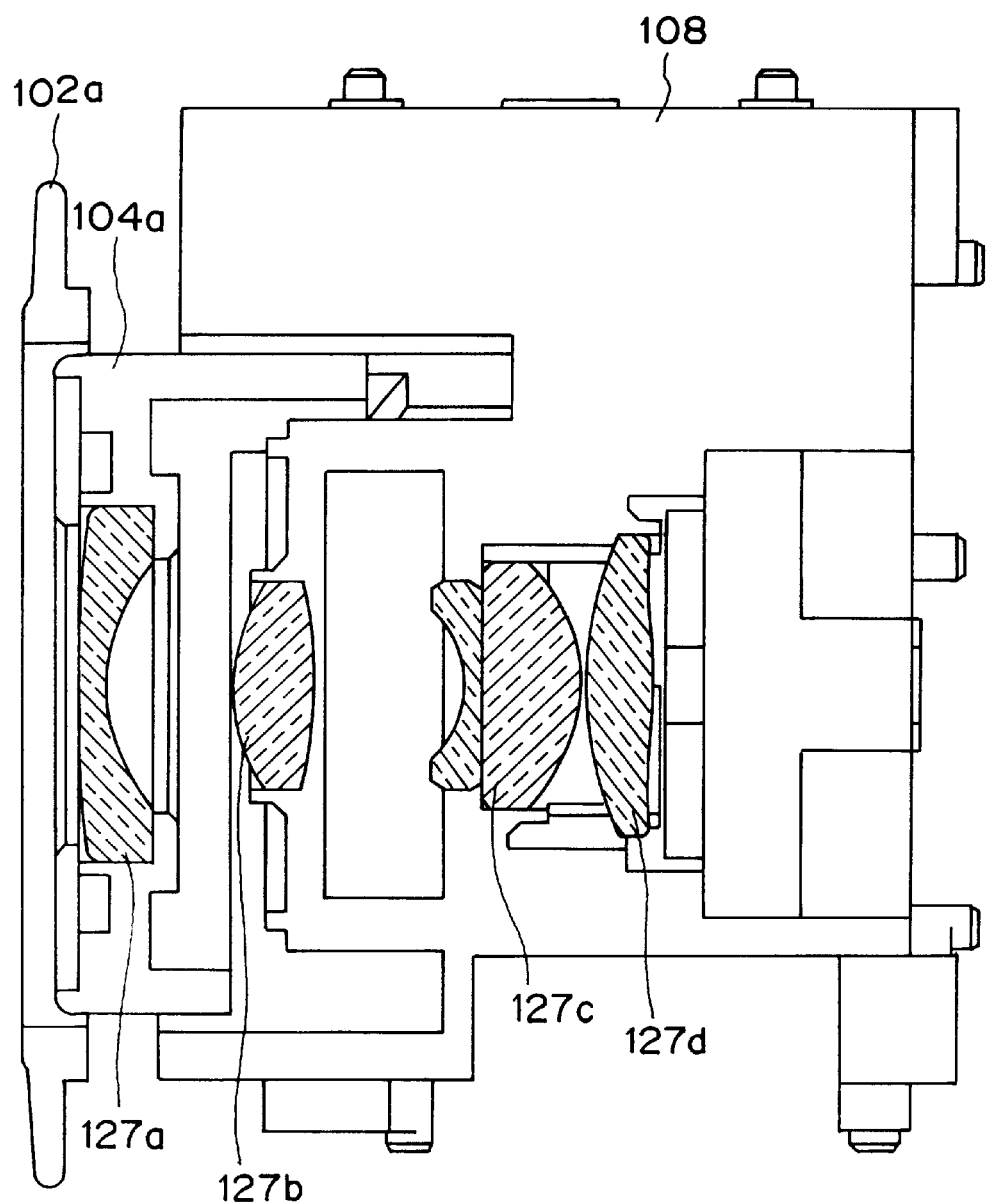
FIG. 10 is a view showing the lens barrel in the image sensing device illustrated in FIG. 2.

FIGS. 4 to 10 are views showing details of the moving lens barrel 104a, the iris (which also serves as a shutter) 106a, and the fixed lens barrel 108. FIG. 4 is a front view, FIGS. 5, 6, and 7 are side views of the right side, and FIGS. 8, 9, and 10 are sectional views of the central right side.

FIGS. 5 and 8 show the state in which the moving lens barrel 104a is at the collapsed (housed) position which is within "non image-sensing region". FIGS. 6 and 9 show the state in which the moving lens barrel 104a is extended to an image sensing position which is within a "image-sensing region". FIGS. 7 and 10 show the state in which the moving lens barrel 104a is in a reset position.

In FIGS. 8 and 9, reference numerals 127a to 127d denote photographing lenses: 127a is a G1 lens (glass lens), 127b is a G2 lens, 127c is a G3–G4 cemented lens, and 127d is a G5 lens. The G1 lens 127a is caulked to the moving lens barrel 104a. The G2 lens 127b, the G3–G4 cemented lens 127c, and the G5 lens 127d are caulked to the fixed lens barrel 108 (FIG. 8).

In FIG. 4, reference numeral 128 denotes a main guide bar of the moving lens barrel 104a; and 129, a sub-guide bar of the moving lens barrel 104a. The moving lens barrel 104a can move in the direction of optical axis while being guided by the main guide bar 128 and the sub-guide bar 129. A lead screw 130 is an output shaft of a lens barrel driving stepping motor (not shown). In FIG. 6, nut 131 engages with this lead screw 130. This nut 131 is clamped by a member $104a_1$ of the moving lens barrel 104a, and the rotation of the nut 131 is regulated by the moving lens barrel 104a. When the lens barrel driving stepping motor rotates in this state, in accordance with the direction of this rotation the moving lens barrel 104a moves step by step in the direction of optical axis along the main guide bar 128 and the sub-guide bar 129.

Referring to FIGS. 5 to 7, a photointerrupter 132 is attached to the fixed lens barrel 108. A light-shielding plate 133 is attached to the moving lens barrel 104a and shields projected light from the photointerrupter 132 in accordance with the movement in the optical axis direction of the moving lens barrel 104a. In the embodiment, the light from the photointerrupter 132 is not shielded when the moving lens barrel 104a is housed (collapsed), and is completely shielded when the lens barrel 104a is in the sensing region. That is, a switching point between non-light shielding and light shielding of the photointerrupter 132 exists between the position of housing (collapse) and the sensing region of the moving lens barrel 104a. This switching point is the reset position of the moving lens barrel 104a. At this switching point the moving lens barrel 104a is collapsed inside the housing (outer casing) 101 in front of the lens barrel.

In the image sensing device of the embodiment, the housing (collapse) position and the infinite and closest positions of the sensing region of the moving lens barrel 104a can be controlled by storing them as the numbers of steps of the stepping motor from the reset position in the CPU 125.

Figures 11A, 11B:
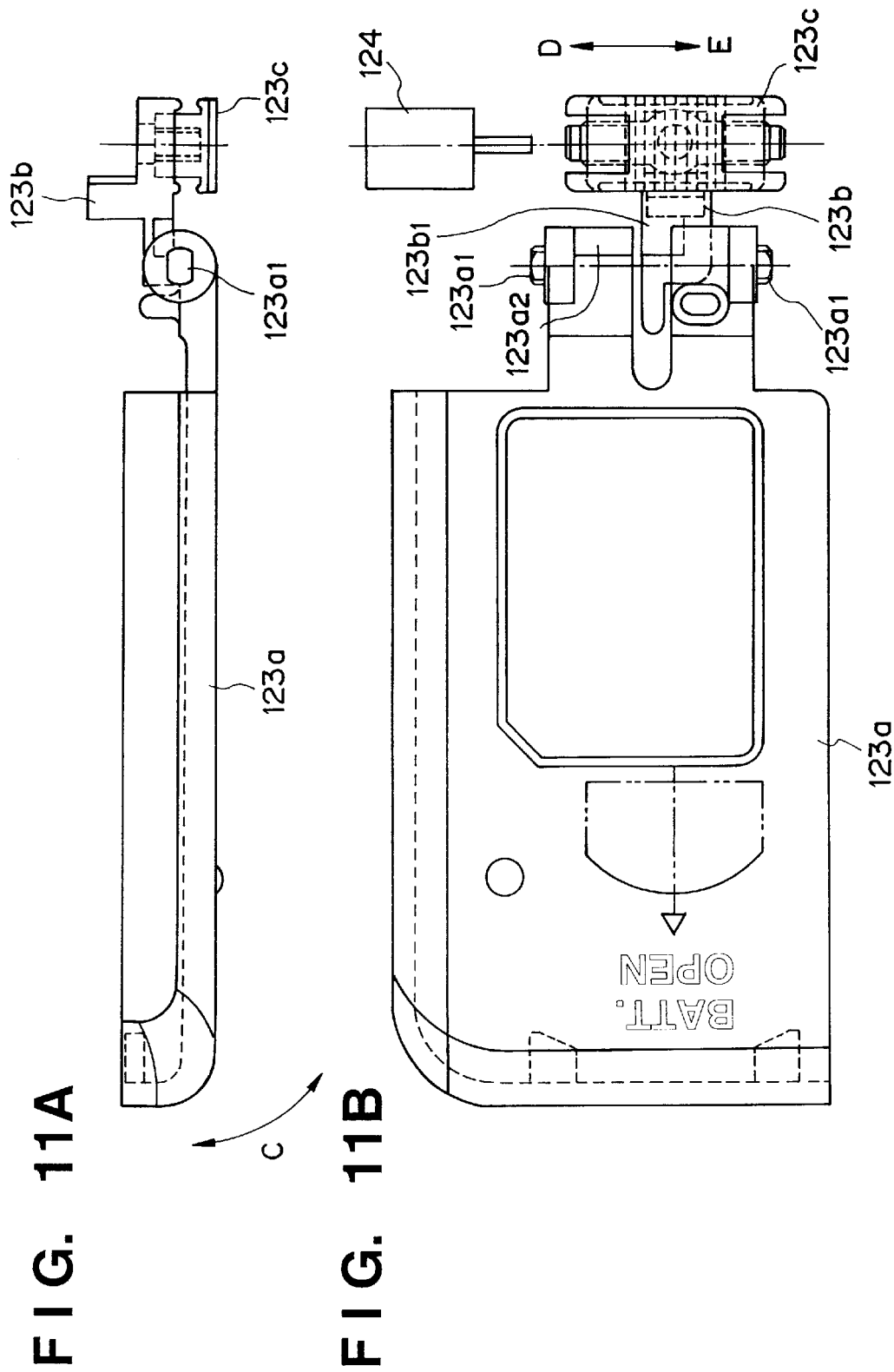
FIGS. 11A and 11B are plan and front views respectively showing a battery cover in the image sensing device illustrated in FIG. 2.

FIGS. 11A and 11B illustrate plan and front views respectively showing details of the battery cover 123a, the detection switch 124, and their peripheral components.

Referring to FIG. 11A, the battery cover 123a can pivot in a direction C upon a shaft $123a_1$. Referring to FIG. 11B, a slide button 123c is positioned outside the housing (outer casing) 101 and can slide in directions D and E. A locking member 123b is positioned inside the housing and moves integrally with the slide button 123c. When the slide button 123c is slid in the direction D, a member $123b_1$ engages with a member $123a_2$ of the battery cover 123a to lock the pivot of the battery cover 123a. The detection switch 124 can detect the position of the locking member 123b which moves integrally with the slide button 123c. Since, therefore, the state of the slide button 123c which is slid to open the battery cover 123a can be detected, this image sensing device can detect the possibility of the battery cover 123a being opened, i.e., the possibility of the battery being removed.

Figure 12A:
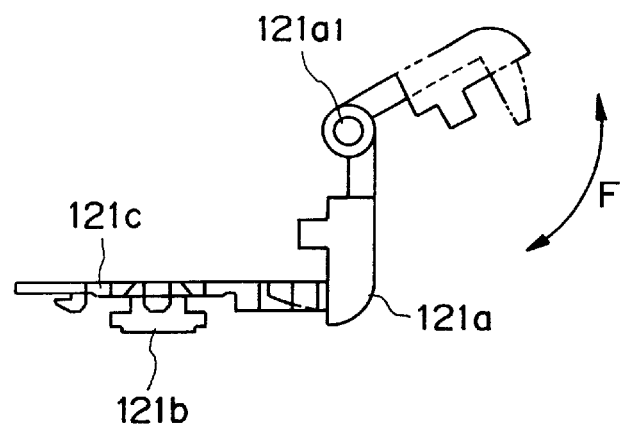
FIGS. 12A and 12B are plan and front views respectively showing a CF cover in the image sensing device illustrated in FIG. 2.
Figure 12B:
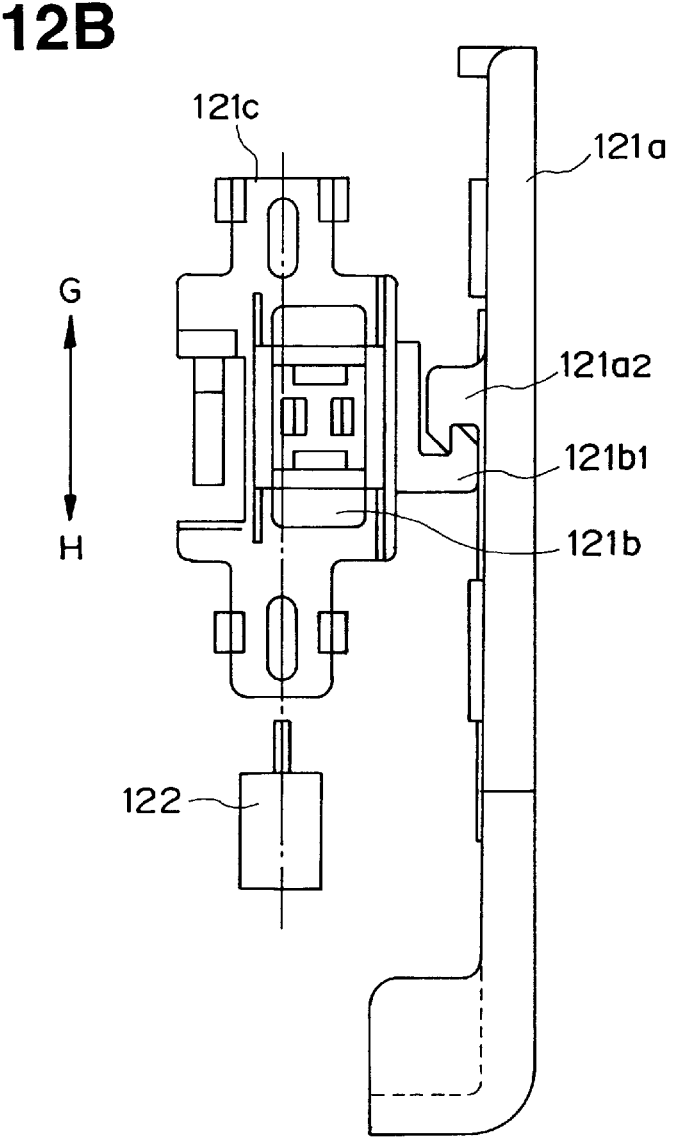

FIGS. 12A and 12B illustrate plan and front views respectively showing details of the CF cover 121a, the detection switch 122, and their peripheral parts.

Referring to FIG. 12A, the CF cover 121a can pivot in a direction F upon a shaft $121a_1$. Referring to FIG. 12B, a slide button 121b is positioned outside the housing (outer casing) 101 and can slide in directions G and H. A locking member 121c is positioned inside the housing and moves integrally with the slide button 121b. When the slide button 121b is slid in the direction G, a member $121b_1$ engages with a member $121a_2$ of the CF cover 121a to lock the pivot of the CF cover 121a. A detection switch 122 can detect the position of the locking member 121c which moves integrally with the slide button 121b. Hence, the state of the slide button 121b which is slid to open the CF cover 121a can be detected, so this image sensing device can detect the possibility of the CF cover 121a being opened, i.e., the possibility of the CF being removed.

Figure 13A:
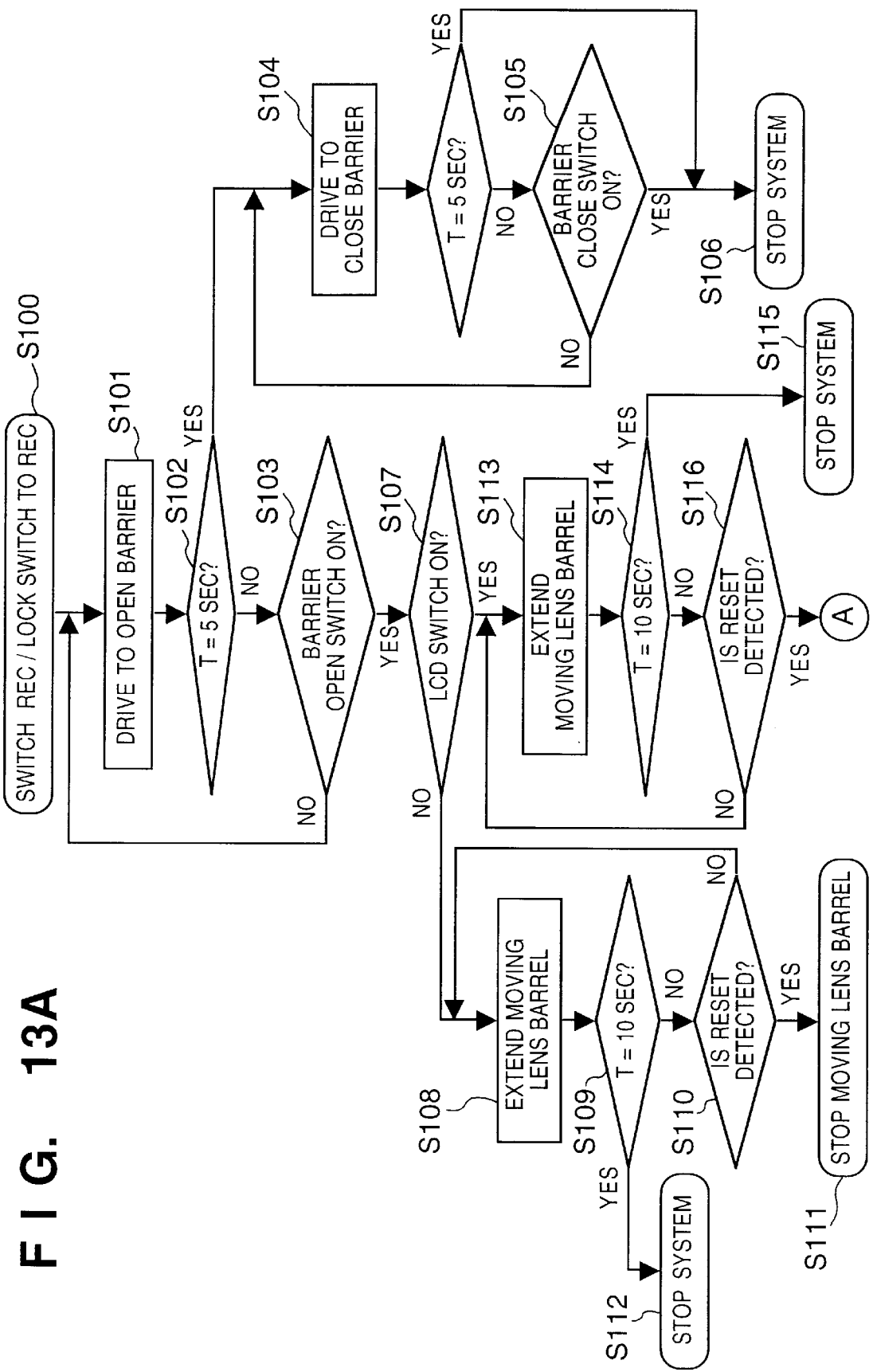
Figure 13B:
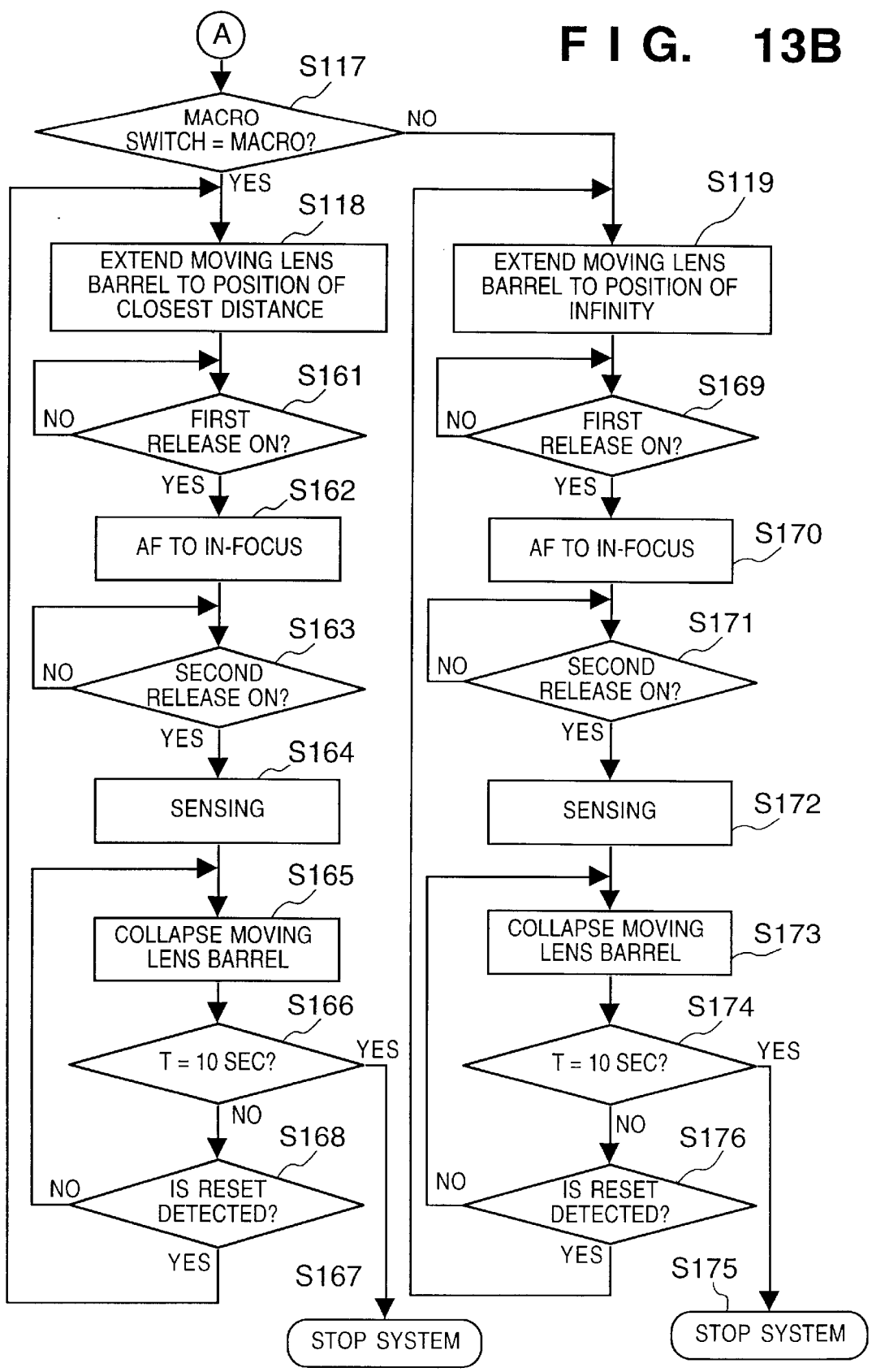

FIG. 13 is a flow chart for principally explaining the motions of the moving lens barrel 104a and the lens barrier 102a when the REC/LOCK switch 117 of this image sensing device is switched from the LOCK position to the REC (sensing) position. The motions are controlled by the CPU 125.

The REC/LOCK switch 117 is switched from the LOCK position to the REC position (step S100). The stepping motor as the actuator 102b rotates in a direction in which the lens barrier 102a opens (step S101). This stepping motor rotates for five seconds until the leaf switches $102c_3$ and $102c_2$ of the detection switch 102c are turned on (detect the opening of the lens barrier 102a) (step S102).

If the detection switch 102c is not turned on even after the stepping motor as the actuator 102b is driven for five seconds, the CPU 125 determines that a system error has occurred, and the actuator 102b rotates in a direction in which the lens barrier 102a closes (step S104).

The stepping motor as the actuator 102b rotates for five seconds until the leaf switches $102c_1$ and $102c_2$ of the detection switch 102c are turned on (detect the closure of the lens barrier 102a) (step S105). When the leaf switches $102c_1$ and $102c_2$ are turned on, the CPU 125 stops the system (step S106). If the leaf switches $102c_1$ and $102c_2$ are not turned on (do not detect the closure of the lens barrier 102a) even after the five-second rotation, the CPU 125 determines that a system error has occurred and stops the system (step S106).

If the leaf switches $102c_3$ and $102c_2$ of the detection switch 102c are turned on (detect the opening of the lens barrier 102a, step S103), the CPU 125 detects whether the LCD switch 116 is ON or OFF (step S107). If the LCD switch 116 is OFF (i.e., the panel of the LCD 113 is OFF), a photographer is framing through the optical finder 119.

The lens barrel driving stepping motor is driven in a direction in which the moving lens barrel 104a is extended (step S108). This lens barrel driving stepping motor is driven for ten seconds until the reset position of the moving lens barrel 104a is detected (step S110). If the reset position is detected within this ten-second driving (step S110), the CPU 125 stops the moving lens barrel 104a by stopping the stepping motor (step S111). If the reset position is not detected even after the ten-second driving, the CPU 125 determines that a system error has occurred and stops the system (step S112).

In the above operation, the moving lens barrel 104a is stopped in the reset position in steps S110 and S111. However, the moving lens barrel 104a can also be kept stopped in the housing (collapse) position or stopped before or behind the reset position by a predetermined distance, as long as the moving lens barrel 104a does not protrude from the outer casing.

If the LCD switch is ON (i.e., the panel of the LCD 113 is ON), it is highly likely that the photographer is framing on a live image on the LCD.

If this is the case, this live image needs to be focused to a certain degree. The lens barrel driving stepping motor is driven in the direction in which the moving lens barrel 104a is extended (step S113). The lens barrel moving stepping motor is driven for ten seconds until the reset position of the moving lens barrel 104a is detected (step S114). If the reset position is not detected even after this ten-second driving, the CPU 125 determines that a system error has occurred and stops the system (step S115).

If the reset position is detected (step S116), the CPU 125 detects whether the macro/non-macro sensing region switch 126 indicates macro (closest) or non-macro (normal distance) (step S117). If macro is indicated, the CPU 125 extends the moving lens barrel 104a to a position where an object at infinity is focused, which is prestored as the number of stepping motor pulses from the reset position (step S118). In this image sensing device, the closest distance is 10 cm.

When the first release of the release switch 118 is turned on (step S161), the moving lens barrel 104a is driven to an in-focus position by hill climbing AF (step S162). When the second release of the release switch 118 is turned on (step S163), an image is sensed (step S164). Steps 165 to S168 are operations performed while the sensed image is recorded on the CF card (recording medium) in the CF slot (recording medium slot) 115 via the A/D converter 11 and the image signal processing IC 112.

The lens barrel driving stepping motor is driven in a direction in which the moving lens barrel 104a is collapsed (step S165). This lens barrel driving stepping motor is driven for ten seconds until the reset position of the moving lens barrel 104a is detected (step S166). If the reset position is detected within this ten-second driving (step S168), the CPU 125 extends the moving lens barrel 104a to the position where an object at the closest distance is focused, which is prestored as the number of stepping motor pulses from the reset position (step S118). If the reset position is not detected even after the ten-second driving, the CPU 125 determines that a system error has occurred and stops the system (step S167).

If non-macro is indicated, the CPU 125 extends the moving lens barrel 104a to a position where an object at infinity is focused, which is prestored as the number of stepping motor pulses from the reset position (step S119). When the first release of the release switch 118 is turned on (step S169), the moving lens barrel 104a is driven to an in-focus position by so-called hill climbing AF (step S170). When the second release of the release switch 118 is turned on (step S171), an image is sensed (step S172). Steps S173 to S176 are operations performed while the sensed image is recorded on the CF card (recording medium) in the CF slot (recording medium slot) 115 via the A/D converter 11 and the image signal processing IC 112.

The lens barrel driving stepping motor is driven in the direction in which the moving lens barrel 104a is collapsed (step S173). This lens barrel driving stepping motor is driven for ten seconds until the reset position of the moving lens barrel 104a is detected (step S174). If the reset position is detected within this ten-second driving (step S176), the CPU 125 extends the moving lens barrel 104a to the position where an object at the closest distance is focused, which is prestored as the number of stepping motor pulses from the reset position (step S119). If the reset position is not detected even after the ten-second driving, the CPU 125 determines that a system error has occurred and stops the system (step S175). In this image sensing device, the collapsed position, reset position, infinity position, and closest position of the moving lens barrel 104a are arranged in this order from the image formation surface (CCD 109).

Figure 14:
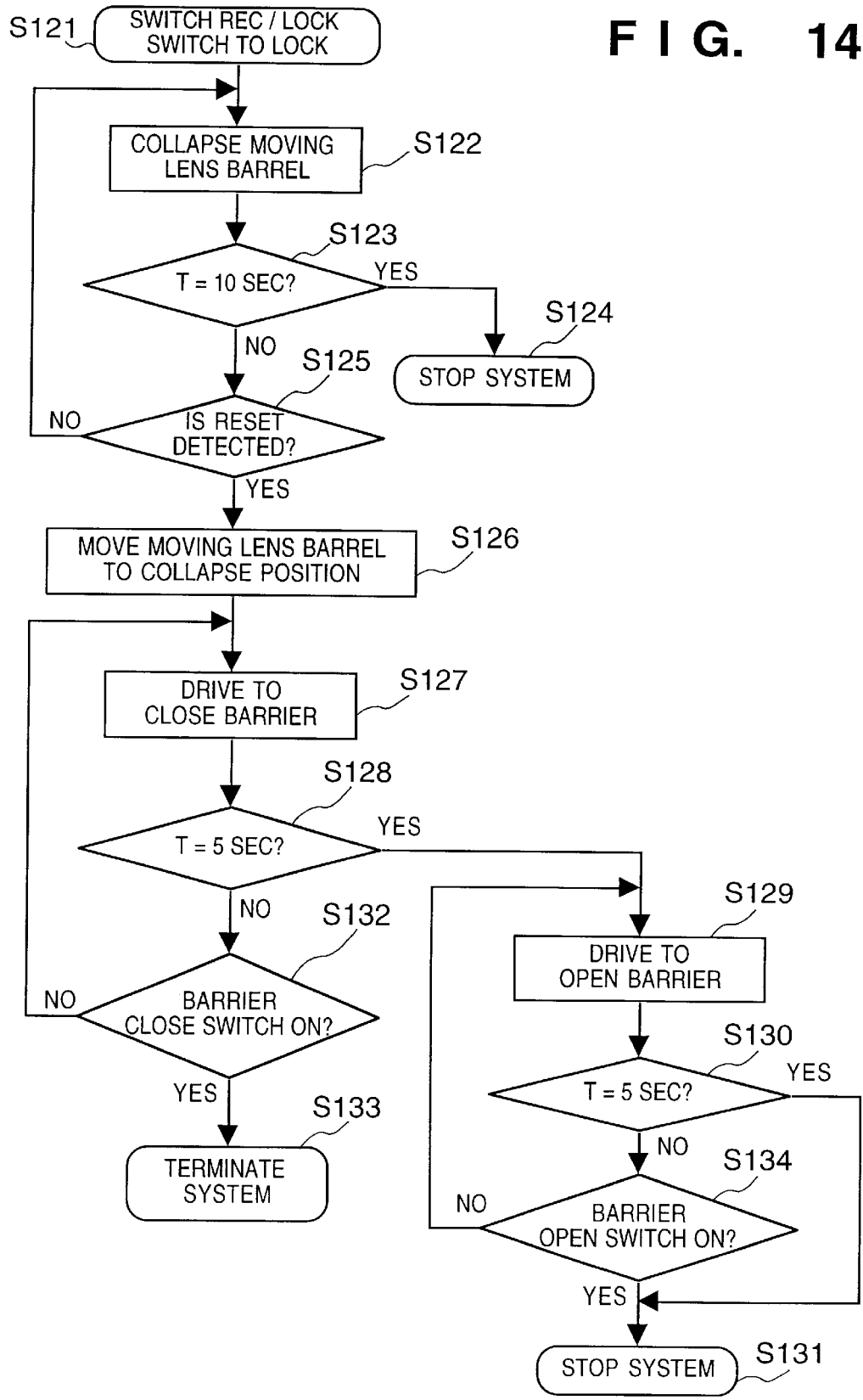
FIG. 14 is a flow chart showing operation operated by a CPU of the image sensing device illustrated in FIG. 2.

FIG. 14 is a flow chart for principally explaining the motions of the moving lens barrel 104a and the lens barrier 102a when the REC/LOCK switch 117 of the image sensing device is switched from the REC (sensing) position to the LOCK position.

The REC/LOCK switch 117 is switched from the REC position to the LOCK position (step S121). The lens barrel driving stepping motor is driven in the direction in which the moving lens barrel 104a is collapsed (step S122). This lens barrel driving stepping motor is driven in the collapsing direction for ten seconds until the reset position of the moving lens barrel is detected (step S123). If the reset position is not detected even after this ten-second driving, the CPU 125 determines that a system error has occurred and stops the system (step S124).

If the reset position is detected (step S125), the CPU 125 collapses the moving lens barrel 104a to a housing (collapse) position which is prestored as the number of stepping motor pulses from the reset position (step S126). The stepping motor as the actuator 102b rotates in the direction in which the lens barrier 102a closes (step S127). This stepping motor rotates for five seconds until the leaf switches $102c_1$ and $102c_2$ of the detection switch 102c are turned on (detect the closure of the lens barrier 102a) (step S128). If the detection switch 102c is turned on (step S132), the CPU 125 terminates the system (step S133).

If the detection switch 102c is not turned on even after the stepping motor as the actuator 102b is driven for five seconds, the CPU 125 determines that a system error has occurred, and the actuator 102b rotates in the direction in which the lens barrier 102a opens (step S129).

The stepping motor as the actuator 102b rotates for five seconds until the leaf switches $102c_3$ and $102c_2$ of the detection switch 102c are turned on (detect the opening of the lens barrier 102a) (step S130). If the detection switch 102c is turned on (step S134), the CPU 125 stops the system (step S131). If the leaf switches $102c_1$ and $102c_2$ are not turned on (do not detect the closure of the lens barrier 102a) even after this five-second rotation, the CPU 125 determines that a system error has occurred and stops the system (step S131).

In this description, "termination" of the system means that the operation is ended after the system normally operates. "Stop" of the system means that the operation is unavoidably ended because the system cannot normally operate.

Figure 15:
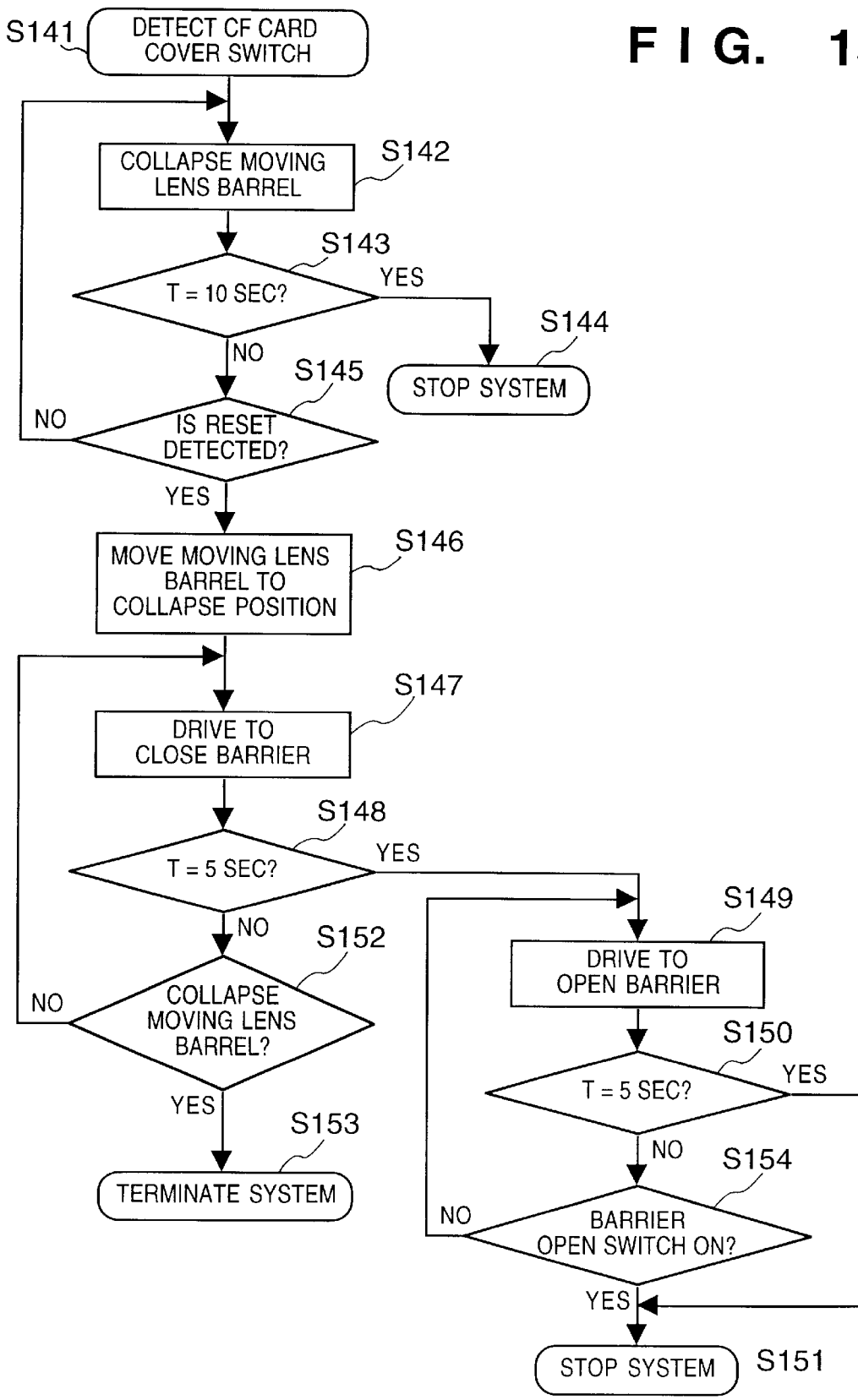
FIG. 15 is a flow chart showing operation operated by the CPU of the image sensing device illustrated in FIG. 2.

FIG. 15 is a flow chart for principally explaining the motions of the moving lens barrel 104a and the lens barrier 102a when the REC/LOCK switch 117 of this image sensing device is in the REC position and the detection switch 122 detects the possibility of the CF cover 121a being opened.

The detection switch 122 detects the possibility of the CF cover 121a being opened (step S141).

The lens barrel driving stepping motor is driven in the direction in which the moving lens barrel 104a is collapsed (step S142). This lens barrel driving stepping motor is driven in the collapsing direction for ten seconds until the reset position of the moving lens barrel is detected (step S143). If the reset position is not detected even after this ten-second driving, the CPU 125 determines that a system error has occurred and stops the system (step S144).

If the reset position is detected (step S145), the CPU 125 collapses the moving lens barrel 104a to the housing (collapse) position which is prestored as the number of stepping motor pulses from the reset position (step S146). The stepping motor as the actuator 102b rotates in the direction in which the lens barrier 102a closes (step S147). This stepping motor rotates for five seconds until the leaf switches $102c_1$ and $102c_2$ of the detection switch 102c are turned on (detect the closure of the lens barrier 102a) (step S148). If the detection switch 102c is turned on (step S152), the CPU 125 terminates the system (step S153).

If the detection switch 102c is not turned on even after the stepping motor as the actuator 102b is driven for five seconds, the CPU 125 determines that a system error has occurred, and the actuator 102b rotates in the direction in which the lens barrier 102a opens (step S149).

The stepping motor as the actuator 102b rotates for five seconds until the leaf switches $102c_3$ and $102c_2$ of the detection switch 102c are turned on (detect the opening of the lens barrier 102a) (step S150). If the detection switch 102c is turned on (step S154), the CPU 125 stops the system (step S151). If the leaf switches $102c_1$ and $102c_2$ are not turned on (do not detect the closure of the lens barrier 102a) even after this five-second rotation, the CPU 125 determines that a system error has occurred and stops the system (step S151).

Operation is performed following essentially the same flow as shown in FIG. 15 when the detection switch 124 detects the possibility of the battery cover 123a being opened or when the CPU 125 detects a voltage drop of the power supply or some other system error.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The embodiments can be modified in various ways.

The present invention can be applied, for example, to a modification where a barrel is extended and retracted for altering a focal length of the camera.

Further, the embodiments described above, performs the extracting and retracting operations of the image sensing optical system (barrel) in response to the operation of the LCD switch 116. The present invention is not limited to such switching by the LCD switch 116. For example, the operations of the barrel may be triggered in response to operations on other external switches, for example to changing over image recording (sensing) and image reproducing during the apparatus is powered up.

The software and/or hardware configurations, for example, may be replaced or substituted in suitable manner.

Further, the present invention can be constituted of any combinations of the above described embodiments, as the occasions demand. Further, the present invention can be constituted of necessary components of any ones of the above described embodiments, as the occasions demands.

Further, the present invention can be applied to a device unit comprising the entire or partial structure of the claimed apparatus or embodied apparatus. Furthermore, the invention may be applied to a system wherein they are combined with another unit, or to a component comprised of an apparatus.

The present invention can be applied yet further to digital still cameras, video cameras, various types of cameras such as cameras using silver-salt films, any types of image sensing devices or optical devices except for cameras, and other types of devices. It can be further applied to a device which is applied to the cameras, optical devices and the other types of devices, or to any component comprising the cameras, the optical devices and the other types of devices.

What is claimed is:

1. An image sensing apparatus comprising:
    a driving device that moves an image sensing optical system to image sensing and non image sensing regions;
    a protection cover that protects the optical system; and
    an external operation device that voluntarily selects a first mode in which said protection cover is opened and the optical system is positioned in the image sensing region, or a second mode in which said protection cover is opened and the optical system is positioned in the non image sensing region by an external operation, wherein the first mode and the second mode are an ON mode.

2. An apparatus according to claim 1, wherein the non image sensing region includes a position where said optical system is stored.

3. An apparatus according to claim 1, wherein the non image sensing region includes a predetermined position where the optical system is collapsed in a body of the image sensing apparatus.

4. An apparatus according to claim 1, wherein said external operation device enables an electronic view finder in the first mode and disables the electronic view finder in the second mode.

5. An apparatus according to claim 4, wherein
    when the external operation device is operated so as to position the optical system to the image sensing region, the external operation device enables the electronic view finder, and
    when the external operation device is operated so as to position the optical system to the non image sensing region, the external operation device disables the electronic view finder.

6. An apparatus according to claim 1, wherein the image sensing apparatus is powered off by being released from the ON mode.

7. An apparatus according to claim 1, further comprising:
    a controller that moves the optical system into the non image sensing region in response to a detection that a predetermined attachable member is detached from the image sensing apparatus.

8. An apparatus according to claim 7, wherein the predetermined attachable member comprises an image recording medium.

9. An apparatus according to claim 7, wherein the predetermined attachable member comprises a battery.

10. An apparatus according to claim 1, further comprising:
    a controller that moves the optical system into the non image sensing region in response to a detection of drop in power supply voltage.

11. An apparatus according to claim 1, further comprising:
    a controller that moves the optical system into the non image sensing region in response to a fault detection in the image sensing apparatus.

12. An image sensing apparatus comprising:
    a driving device that moves an image sensing optical system in an extended-out direction and a retracted-in-direction;
    a protection cover that protects the optical system; and
    an external operation device that voluntarily selects a first mode in which said protection cover is opened and the optical system is allowed to move in an image sensing region, or a second mode in which said protection cover is opened and the optical system is not allowed to move in the image sensing region by an external operation, wherein the first mode and the second mode are an ON mode.

13. An apparatus according to claim 12, wherein said external operation device enables an electronic view finder in the first mode and disables the electronic view finder in the second mode.

14. An apparatus according to claim 13, wherein when the external operation device is operated so that the optical system is allowed to move in the image sensing region, the external operation device enables the electronic view finder, and
    when the external operation device is operated so that the optical system is not allowed to move in the image sensing region, the external operation device disables the electronic view finder.

15. An apparatus according to claim 12, wherein the image sensing apparatus is powered off by being released from the ON mode.

16. An apparatus according to claim 1, further comprising:
a controller that moves the optical system in the retracted-in direction, in response to a detection that a predetermined attachable member is detached from the image sensing apparatus.

17. An apparatus according to claim 16, wherein the predetermined attachable member comprises an image recording medium.

18. An apparatus according to claim 16, wherein the predetermined attachable member comprises a battery.

19. An apparatus according to claim 12, further comprising:
a controller that moves the optical system to the retracted-in position in response to a detection of drop in power supply voltage.

20. An apparatus according to claim 12, further comprising a controller that moves the optical system in the retracted-in direction in response to a fault detection in the image sensing apparatus.

21. An image sensing apparatus comprising:
a driving device that moves an image sensing optical system to image sensing and non image sensing regions;
a protection cover that protects the optical system;
an external operation device that voluntarily selects a first mode in which said protection cover is opened and the optical system is positioned in the image sensing region, or a second mode in which said protection cover is opened and the optical system is positioned in the non image sensing region by an external operation, wherein the first mode and the second mode are an ON mode; and
a controller that controls the driving device in response to the operation on the external operation device.

22. An apparatus according to claim 21, wherein said external operation device enables an electronic view finder in the first mode and disables the electronic view finder in the second mode.

23. An image sensing apparatus comprising:
a driving device that moves an image sensing optical system in an extended-out direction and a retracted-in direction;
a protection cover that protects the optical system;
an external operation device that voluntarily selects a first mode in which said protection cover is opened and the optical system is allowed to move in an image sensing region or a second mode in which said protection cover is opened and the optical system is not allowed to move in the image sensing region by an external operation, wherein the first mode and the second mode are an ON mode; and
a controller that controls the driving device in response to the operation on the external operation device.

24. An apparatus according to claim 12, wherein said external operation device enables an electronic view finder in the first mode and disables the electronic view finder in the second mode.

25. A camera comprising:
a driving device that moves a photographing optical system to photographing and non photographing regions;
a protection cover that protects the optical system; and
an external operation device that voluntarily selects a first mode in which said protection cover is opened and the optical system is positioned in the photographing regions, or a second mode in which said protection cover is opened and the optical system is positioned in the non photographing region by an external operation, wherein the first mode and the second mode are an ON mode.

26. A camera comprising:
a driving device that moves a photographing optical system in an extended-out direction and a retracted-in direction;
a protection cover that protects the optical system; and
an external operation device that voluntarily selects a first mode in which said protection cover is opened and the optical system is allowed to move in a photographing region, or a second mode in which said protection cover is opened and the optical system is not allowed to move in the photographing region by an external operation, wherein the first mode and the second mode are an ON mode.

27. A camera comprising:
a driving device that moves a photographing optical system to photographing and non photographing regions;
a protection cover that protects the optical system;
an external operation device that voluntarily selects a first mode in which said protection cover is opened and the optical system is positioned in the photographing region, or a second mode in which said protection cover is opened and the optical system is positioned in the non photographing region by an external operation, wherein the first mode and the second mode are an ON mode; and
a controller that controls the driving device in response to the operation on the external operation device.

28. A camera comprising:
a driving device that moves a photographing optical system in an extended-out direction and a retracted-in direction;
a protection cover that protects the optical system;
an external operation device that voluntarily selects a first mode in which said protection cover is opened and the optical system is allowed to move in a photographing region, or a second mode in which said protection cover is opened and the optical system is not allowed to move in the photographing region by an external operation, wherein the first mode and the second mode are an ON mode; and
a controller that controls the driving device in response to the operation on the external operation device.

29. A control method adapted to an image sensing apparatus capable of moving an image sensing optical system to image sensing and non image sensing regions comprising:
voluntarily selecting a first mode in which a protection cover that protects the optical system is opened and the optical system is positioned in the image sensing region, or a second mode in which said protection cover is opened and the optical system is positioned in the non image sensing region by an external operation, wherein the first mode and the second mode are an ON mode.

30. A control method adapted to an image sensing apparatus capable of moving an image sensing optical system in extended-out and retracted-in directions comprising:
voluntarily selecting a first mode in which a protection cover that protects the optical system is opened and the optical system is allowed to move in an image sensing region, or a second mode in which said protection cover is opened and the optical system is not allowed to move in the image sensing region by an external operation, wherein the first mode and the second mode are an ON mode.

31. A control method adapted to a camera capable of moving a photographing optical system to photographing and non photographing regions comprising:

voluntarily selecting a first mode in which a protection cover that protects the optical system is opened and the optical system is positioned in the photographing region, or a second mode in which said protection cover is opened and the optical system is positioned in the non photographing region by an external operation, wherein the first mode and the second mode are an ON mode.

32. A control method adapted to an image sensing apparatus capable of moving a photographing optical system in extended-out and retracted-in directions comprising:

voluntarily selecting a first mode in which a protection cover that protects the optical system is opened and the optical system is allowed to move in a photographing region or a second mode in which said protection cover is opened and the optical system is not allowed to move in the photographing region by an external operation, wherein the first mode and the second mode are an ON mode.

* * * * *